Patented July 29, 1952

2,605,273

UNITED STATES PATENT OFFICE 2,605,273

α,β-DICHLOROETHYLSILANES

Leo H. Sommer, State College, Pa., assignor to Dow Corning Corporation, Midland, Mich., a corporation of Michigan No Drawing. Application June 3, 1949,
Serial No. 97,085

4 Claims. (Cl. 260—448.2)

The present invention relates to chlororganic derivatives of silicon.

The chlorination of organic derivatives of silicon has been referred to in the literature. When a methylchlorosilane is chlorinated, the chlorine selectively chlorinates any methyl radical which is already chlorinated. The polychlorinated radical so obtained is unstable. I have found that in the chlorination of ethylchlorosilanes the chlorine also chlorinates previously chlorinated radicals with the principal product being the β,β-dichloroethylchlorosilane. This material is relatively unstable and is not a satisfactory intermediate for many uses.

Compounds in accordance herewith correspond to the general formula $ClCH_2CHClSiR_{3-n}Cl_n$ in which $n$ has an average value of from 0 to 3 inclusive and in which R represents alkyl.

Compounds of this type as is to be seen from the above formula contain the monovalent α,β-dichloroethyl radical. This radical, it has now been found, is relatively stable. Such compounds containing this radical are of substantial use as intermediates in the preparation of siloxane polymers and copolymers and in the production of compounds such as α-chlorovinylsilicon compounds.

While the β,β-dichloroethyl silanes are the product of chlorinating ethyl silanes, it has been found that the α,β-dichloroethyl compounds may be prepared in excellent yield by the chlorination of vinyl silanes. The vinyl derivatives of silicon and their preparation are known. Thus, Ushakov, in the Journal of General Chemistry (USSR) at volume 7, pages 2492–2498, shows the chlorination to produce an α-chloroethylsilane and the dehydrohalogenation thereof to produce vinyl silane.

The chlorination of the vinyl silicon compounds may be conducted by the direct chlorination thereof with chlorine gas. The rate of the reaction may be increased by customary means as by radiation with ultraviolet light or by the use of a catalyst.

As indicated by the general formula above stated, the compounds hereof are those which contain one α,β-dichloroethyl radical and a total of three alkyl and chloro radicals or atoms linked to the silicon. The alkyl radicals so linked to the silicon may be of any desired length as for example from methyl to octadecyl. When the silane contains three alkyl radicals, the compound is substantially non-functional except for the chlorines of the dichloroethyl radical. Those silanes which contain chlorine linked directly to the silicon are functional both with respect to the chlorines of the dichloroethyl radical and with respect to the chlorines linked to the silicon. These latter silanes are of utility in the production of siloxane polymers and copolymers.

Exmaple 1

Chlorine was passed through 26 g. of vinyl trichlorosilane in a reaction vessel equipped with a reflux condenser. As the concentration of chlorine increased, the rate of chlorination increased with the liberation of heat. The reaction mixture was cooled to prevent overheating. The chlorinated product was fractionated with the following fractions being obtained.

|     | T°C.  | Gr. | Pressure |
|-----|-------|-----|----------|
| 1   | 180   | 6   | 732      |
| 2   | 180.5 | 8   | 732      |
| 3   | 182   | 14  | 732      |
| 4   | 184   | 3   | 732      |
| res |       | 5   |          |

Cuts 2 and 3 were found to be α,β-dichloroethyltrichlorosilane.

Example 2

Vinyltrimethylsilane was prepared by reaction of a methyl Grignard reagent and vinyltrichlorosilane. 35 grams of the vinyltrimethylsilane so obtained were chlorinated by passing chlorine gas thereinto. The temperature was maintained below room temperature during the reaction. The chlorinated product was fractionated. The desired α,β-dichloroethyltrimethylsilane was obtained and was found to have a boiling point of 61° C. at 13 mm. pressure, a density of 1.0570, an index of refraction at 20° C. of 1.4617 and a melting point of −15° C.

When the vinyltrichlorosilane is partially methylated the compounds methylvinyldichlorsilane and dimethylvinylchlorsilane are obtained. These may be chlorinated whereby to obtain α,β-dichlorethylmethyldichlorsilane and α,β-dichlorethyldimethylchlorsilane.

That which is claimed is:

1. Compounds of the general formula $$ClCH_2CHClSiR_{3-n}Cl_n$$

where $n$ has an average value of from 0 to 3 inclusive and R is an alkyl radical.

2. $ClCH_2CHClSiCl_3$.

3. $ClCH_2CHClSi(CH_3)_3$.

4. The method which comprises reacting free chlorine with a vinyl silane of the general formula $CH_2=CHSiR_{3-n}Cl_n$ where $n$ has an average value of from 0 to 3 inclusive and R is an alkyl radical, by contacting the chlorine and the silane, with the silane in liquid phase, whereby to produce the corresponding α,β-dichlorethylsilane.

LEO H. SOMMER.

REFERENCES CITED

The following references are of record in the file of this patent:

Sommer et al., "Jour. Am. Chem. Soc.," vol. 70, (1948) pages 2872–2874.

Agre, "Jour. Am. Chem. Soc.," vol. 71, (1949) pages 300–304.